(12) United States Patent
Diestre et al.

(10) Patent No.: US 12,420,736 B2
(45) Date of Patent: Sep. 23, 2025

(54) TRIM ELEMENT COMPRISING A GUIDING DEVICE FOR AN AIRBAG, SAID GUIDING DEVICE COMPRISING AN OVERMOLDED STRUCTURE

(71) Applicant: Faurecia Interieur Industrie, Nanterre (FR)

(72) Inventors: Angel Diestre, Barcelona (ES); Ferran Macias, Barcelona (ES); Miguel Olmedo Hernandez, Barcelona (ES); David Onorato Estevez, Barcelona (ES); David Asensio, Barcelona (ES)

(73) Assignee: Faurecia Interieur Industrie, Nanterre (FR)

( * ) Notice: Subject to any disclaimer, the term of this patent is extended or adjusted under 35 U.S.C. 154(b) by 0 days.

(21) Appl. No.: 18/893,093

(22) Filed: Sep. 23, 2024

(65) Prior Publication Data
US 2025/0100498 A1 Mar. 27, 2025

(30) Foreign Application Priority Data
Sep. 21, 2023 (EP) .................................. 23306570.5

(51) Int. Cl.
*B60R 21/2165* (2011.01)
*B60R 21/16* (2006.01)
*B60R 21/215* (2011.01)

(52) U.S. Cl.
CPC .... *B60R 21/2165* (2013.01); *B60R 2021/161* (2013.01); *B60R 2021/21537* (2013.01)

(58) Field of Classification Search
CPC ................ B60R 21/215; B60R 21/216; B60R 21/2165
See application file for complete search history.

(56) References Cited

U.S. PATENT DOCUMENTS

| 5,082,310 A | * | 1/1992 | Bauer | ................. B60R 21/2165 280/732 |
| 5,639,115 A | * | 6/1997 | Kelley | ................ B60R 21/2165 280/732 |

(Continued)

FOREIGN PATENT DOCUMENTS

| CN | 118618247 A | * | 9/2024 | ......... B29C 44/1266 |
| DE | 102016217659 A1 | * | 3/2018 | |

(Continued)

OTHER PUBLICATIONS

European Search Report corresponding to application 23306570.5, dated Mar. 13, 2024, 7 pages.

*Primary Examiner* — Nicole T Verley
(74) *Attorney, Agent, or Firm* — Reising Ethington P.C.

(57) ABSTRACT

A trim element having a body and a guiding device integral with the body and including a transversal wall and a flap connected to the transversal wall by a hinge. The flap is movable relative to the transversal wall between a closed position and an opened position. The guiding device has an overmolded structure including a transversal wall portion extending in the thickness of the transversal wall and a flap portion extending in the thickness of the flap. The guiding device further includes a net, having one end overmolded by the transversal wall portion and one central portion overmolded by the flap portion.

8 Claims, 4 Drawing Sheets

(56) References Cited

U.S. PATENT DOCUMENTS

| | | | |
|---|---|---|---|
| 6,955,376 B1 * | 10/2005 | Labrie | B29C 45/1704 |
| | | | 280/732 |
| 11,173,862 B2 * | 11/2021 | Lee | B60R 21/215 |
| 11,254,278 B2 | 2/2022 | Schulze-Wehnink et al. | |
| 11,351,944 B2 | 6/2022 | Onorato Estevez et al. | |
| 11,485,310 B2 * | 11/2022 | Onorato Estevez | B60R 21/215 |
| 2014/0117649 A1 | 5/2014 | Hoeing | |
| 2014/0375029 A1 * | 12/2014 | Pauthier | B60R 21/215 |
| | | | 264/259 |
| 2019/0329727 A1 | 10/2019 | Onorato Estevez | |

FOREIGN PATENT DOCUMENTS

| | | | | |
|---|---|---|---|---|
| DE | 102017100330 A1 * | 7/2018 | ....... | B29C 45/14786 |
| DE | 102018127994 A1 * | 5/2019 | ........... | B60R 21/205 |
| DE | 202019104741 U1 * | 12/2019 | ........... | B60R 21/205 |
| DE | 202023107128 U1 * | 3/2024 | ........... | B60R 21/215 |
| DE | 202024103141 U1 * | 8/2024 | ........... | B60R 21/205 |
| EP | 2193052 B1 * | 6/2011 | ......... | B60R 21/2165 |
| EP | 3560772 B1 * | 2/2021 | ........... | B60R 21/205 |
| FR | 2927290 A1 * | 8/2009 | ........... | B60R 21/205 |
| FR | 3007348 B1 * | 12/2017 | ............. | B29C 45/14 |
| WO | WO-2012072260 A1 * | 6/2012 | ....... | B29C 45/14065 |

\* cited by examiner

TRIM ELEMENT COMPRISING A GUIDING DEVICE FOR AN AIRBAG, SAID GUIDING DEVICE COMPRISING AN OVERMOLDED STRUCTURE

TECHNICAL FIELD

The present invention relates to a trim element for a vehicle of the type comprising a body, defining an outer face, intended to be turned towards the vehicle interior, and an inner face, opposite the outer face, and at least one guiding device for the deployment of a vehicle airbag, said guiding device being integral with the body and comprising at least one transversal wall protruding from the inner face of the body, said transversal wall delimiting at least part of an inner volume for receiving an airbag during Its deployment and defining at least part of an upper opening for the passage of the deployed airbag, said guiding device further comprising at least one flap connected to the transversal wall by a hinge, said flap being movable relative to said transversal wall between a closed position, wherein the flap closes at least a part of the upper opening and an opened position, wherein the flap frees at least a part of the passage for the deployed airbag.

The invention also relates to a method for producing such a trim element.

BACKGROUND

It is known to provide a trim element for a vehicle interior, such as a dashboard, with a guiding device, also known as a firing channel, arranged to guide the airbag towards the vehicle interior through the body of the trim element when the airbag is inflated and deployed. In order to do so, the guiding device comprises a housing receiving the airbag and forming a channel for guiding the deployment of the airbag through an upper opening of the housing. The upper opening is closed by one or two flaps which are moved by the airbag towards an opened position when the airbag is deployed. The flaps are therefore hinged to walls of the housing to be movable relative to the housing between the closed position and the opened position.

It is known to produce the body of the trim element and the guiding device in a single part, meaning that the body and the guiding device are integral and made of the same material, for example by injection molding in a molding cavity having the shape of the body and of the guiding device. In this case, the flaps are part of the body and the walls of the housing of the guiding device protrude from an inner face of the body around the flaps. The walls each have a thickness, which is substantially equal or close to the thickness of the body.

However, in this case, the injection of material in the molding cavity causes the appearance of sink marks on the outer face of the body opposite the location of the walls on the inner face. These sink marks are particularly problematic when the outer face of the body forms the visible surface of the trim element or when the outer face is directly covered by a skin, for example via a thermocovering process during which the skin adopts the shape of the outer face of the body, i.e. when no foam padding is arranged on the outer face of the body. Indeed, in these cases, the sink marks are clearly visible for the passengers of the vehicle and the aesthetic of the trim element is not satisfactory.

SUMMARY

One of the aims of the invention is to overcome this drawback by proposing a trim element comprising a guiding device integral with the body of the trim element and having a satisfactory visual appearance.

To this end, the invention relates to a trim element of the aforementioned type, wherein the guiding device comprises an overmolded structure comprising at least one transversal wall portion extending in the thickness of at least part of the transversal wall and at least one flap portion extending in the thickness of at least part of the flap, said overmolded structure being overmolded by the material of the body, the guiding device further comprising at least one net, comprising one end overmolded by at least part of the transversal wall portion of the overmolded structure and one central portion overmolded by at least part of the flap portion of the overmolded structure, a portion of the net extending between the end of the net and the central portion of the net forming the hinge of the guiding device.

By providing an overmolded structure comprising a transversal wall portion extending in the thickness of the transversal wall of the guiding device, the thickness of the material forming the body and the guiding device is reduced around the transversal wall portion of the overmolded structure. Such a reduction of thickness prevents the formation of sink marks on the outer face of the body opposite the location of the transversal wall. Consequently, the outer face of the body of the trim element presents a satisfactory visual appearance and the trim element can be used as such or with a skin directly applied on the outer face of the body to be visible from the vehicle compartment. Furthermore, the overmolded structure facilitates the integration of the net forming the hinge of the flap into the trim element.

The trim element can comprise any of the following features, considered alone or according to any technically feasible combination:

- the guiding device comprises two transversal walls extending on either side of the inner volume, the overmolded structure comprising two transversal wall portions, each transversal wall portion extending in the thickness of one of the two transversal walls of the guiding device.
- the guiding device comprises two flaps, closing together the upper opening in the closed position and freeing together the passage for the deployed airbag in the opened position, each flap being connected to one of the transversal walls by a hinge the flap portion of the overmolded structure extending in the thickness of the two flaps.
- two opposite ends of the net are overmolded by at least part of the transversal wall portions of the overmolded structure, the portion of the net extending between the ends and the central portion forming the two hinges between the transversal walls and the flaps of the guiding device, the flaps being connected by a tearable portion, the central portion of the net and the tearable portion being arranged to break during the deployment of the airbag to allow the two flaps to move between the closed position and the opened position.
- the guiding device comprises at least two longitudinal walls extending between ends of the transversal walls and delimiting, with said transversal walls, the inner volume, the overmolded structure comprising at least two longitudinal wall portions, each extending the thickness of at least part of one of the longitudinal walls.
- the thickness of the transversal wall of the guiding device is substantially equal to the thickness of the body between the inner face and the outer face.

the material of the overmolded structure is the same material as the material forming the body.

the guiding device comprises at least one screwing shaft for attaching an airbag module to the guiding device, the overmolded structure comprising at least one screwing shaft portion forming said screwing shaft and being overmolded at least in part by the material of the body.

According to another aspect, the invention relates to a method for producing a trim element as described above comprising at least the following steps:

molding an overmolded structure in a first molding cavity having the shape of the overmolded structure, a net being placed in said first molding cavity such that the net is overmolded by the overmolded structure during the molding of the overmolded structure, molding a body in a second molding cavity having the shape of the body, the overmolded structure being placed in said second molding cavity such that the overmolded structure is overmolded by the body during the molding of the body.

According to an optional feature of the method, the first molding cavity and the second molding cavity are parts of the same molding tool, an overmolded structure for a subsequent trim element being produced together with a trim element comprising a previously produced overmolded structure.

BRIEF DESCRIPTION OF THE DRAWINGS

Other aspect and advantages of the invention will appear upon reading the following description, given by way of example and made in reference to the appended drawings, wherein.

DETAILED DESCRIPTION

Figure 1:
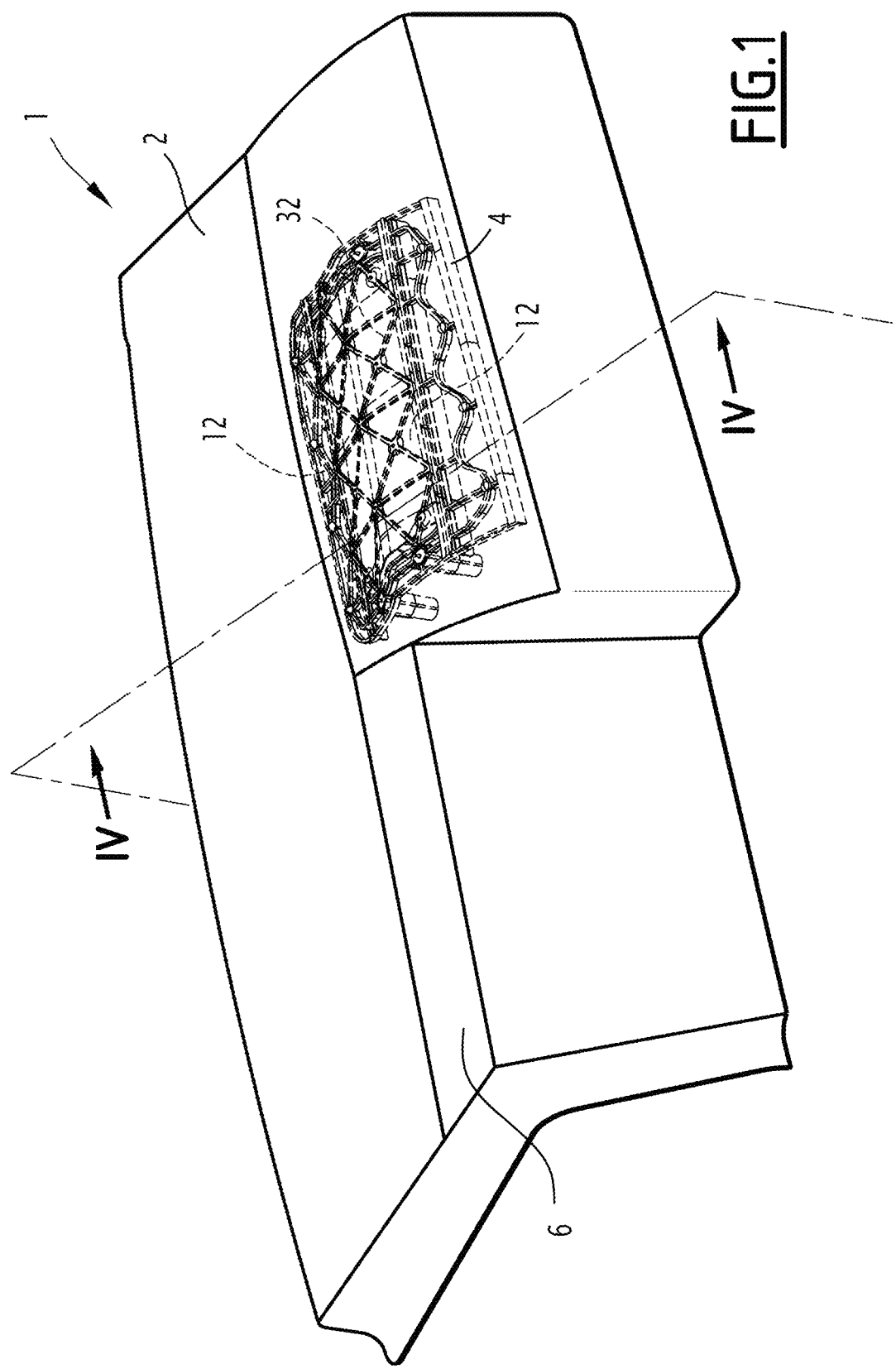
FIG. 1 is a perspective view of a trim element according to an embodiment of the invention, wherein the guiding device is shown in transparency through the body of the trim element.
Figure 2:
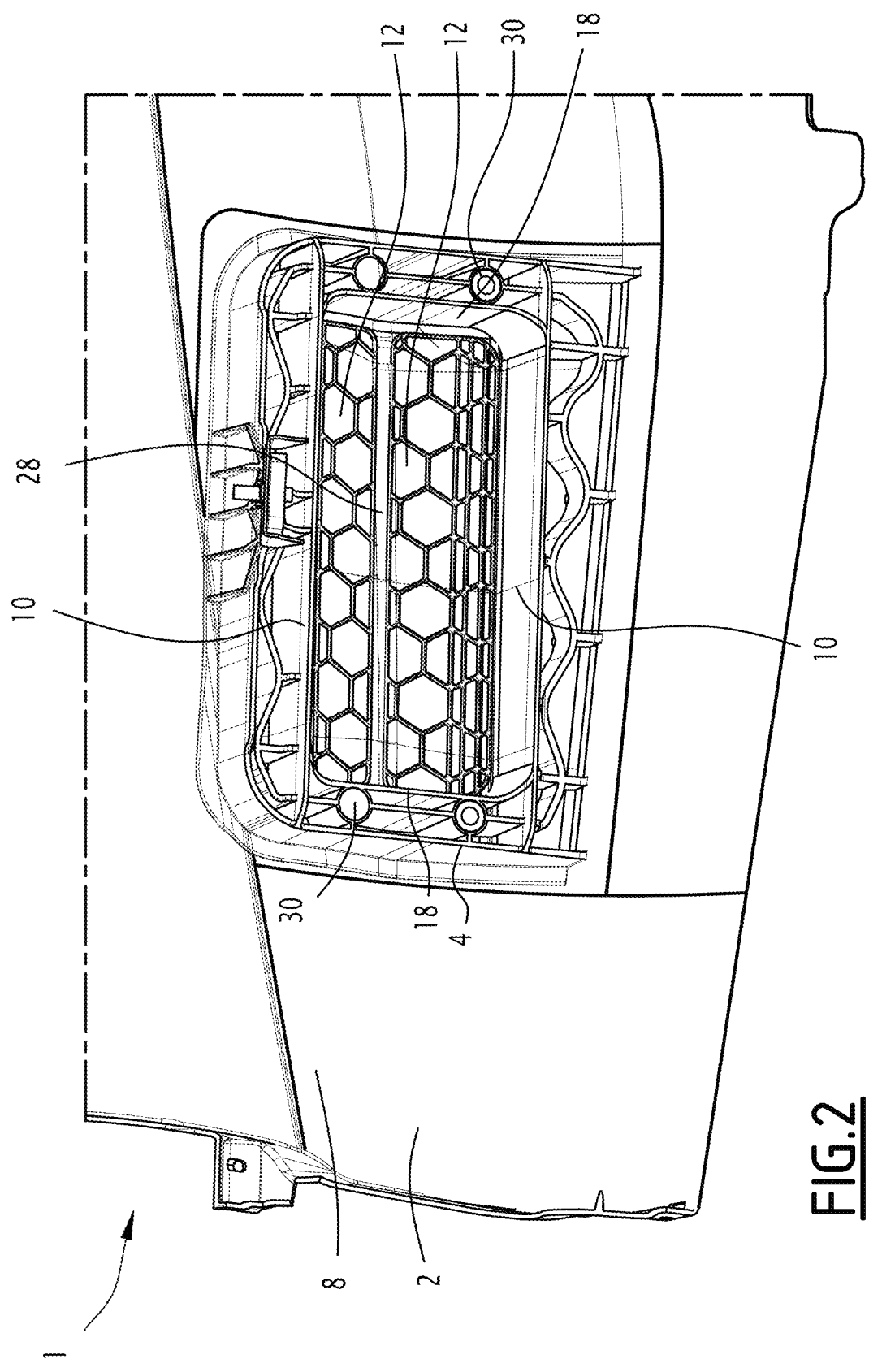
FIG. 2 is a perspective view of part of the trim element of FIG. 1 seen from the inner side.

In reference to FIGS. 1 and 2, a trim element 1 comprising a body 2 and a guiding device 4 is described. The trim element is for example a dashboard, more particularly a dashboard having a visible face formed by an outer face 6 of the body 2 or by a skin extending directly on the outer face 6 of the body 2. By "extending directly", it is meant that the skin is applied on the outer face 6 of the body 2 without an intermediate layer, such as a foam layer, extending between the outer face 6 and the skin.

The outer face 6 of the body 2 is turned towards the vehicle interior and the body 2 comprises an inner face 8 extending opposite the outer face 6 and turned towards the part of the vehicle on which the trim element is installed. The thickness of the body 2 is defined as the distance between the outer face 6 and the inner face 8 of the body 2. The body 2 can have any appropriate shape and the shape shown in FIG. 1 is only given as an example. The thickness of the body 2 is not necessarily constant.

The guiding device 4 extends on the inner face 8 of the body 2 and is arranged to guide an airbag towards the vehicle interior during its deployment, i.e. when the airbag is inflated. The guiding device 4 is integral with the body 2, meaning that the guiding device 4 and the body 2 are produced together as a single part in the same molding cavity, as will be described in greater detail below.

The guiding device 4 comprises at least one transversal wall 10 and at least one flap 12 connected to the transversal wall 10 by a hinge 14.

Figure 4:
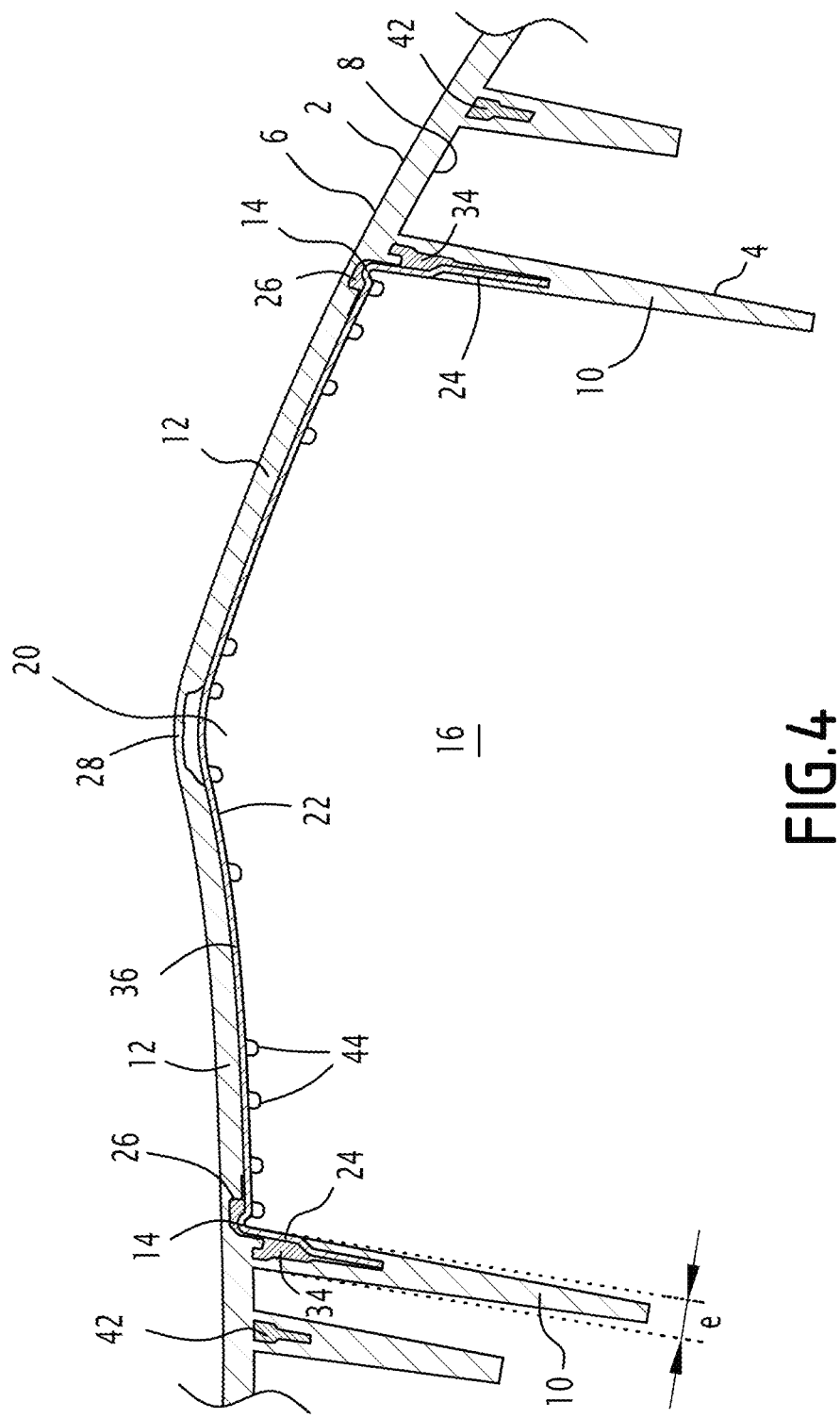
FIG. 4 is transversal cross section view according to axis III-III of FIG. 1.

The transversal wall 10 protrudes from the inner face 8 of the body 2, in an elevation direction, corresponding for example substantially to the direction along which the thickness of the body is measured. In other words, the transversal wall 10 is for example substantially perpendicular to the inner face 8 of the body, as shown in FIG. 4. The transversal wall 10 extends on the inner side of the body 2, i.e. towards the part of the vehicle on which the trim element is installed. The transversal wall extends in a transversal direction corresponding for example to the width of the vehicle when the trim element is a dashboard. The height of the transversal wall 10 is defined as the dimension of the transversal wall in the elevation direction and the thickness "e" of the transversal wall 10 is defined as the dimension of the transversal wall in a longitudinal direction, substantially perpendicular to the transversal direction and to the elevation direction. When the trim element is a dashboard, the longitudinal direction for example corresponds to the rear-front direction of the vehicle.

As shown in FIG. 4, the thickness e of the transversal wall 10 is substantially equal, at least at its upper end attached to the inner face 8 of the body 2, to the thickness of the body 2 in the area where the guiding device 4 is provided.

The transversal wall 10 defines at least a part of an inner volume 16 for receiving an airbag during its deployment. According to the embodiment shown in the figures, the guiding device 4 comprises two transversal wall 10 spaced from each other according to the longitudinal direction and defining between them the inner volume 16. In other words, the transversal walls 10 extend on either side of the inner volume 16 according to the longitudinal direction.

According to the embodiment shown in the figures, the guiding device 4 further comprises at least two longitudinal walls 18 extending along the longitudinal direction between the transversal ends of the transversal walls 10 on either side of the inner volume 16 according to the transversal direction. In other words, the transversal and longitudinal walls 10, 18 define together a housing delimiting the inner volume 16.

The inner volume 16 is opened at the upper ends of the transversal and longitudinal walls by an upper opening 20, delimited by the upper ends of the transversal and longitudinal walls. During its deployment, the airbag passes through the upper opening 20 towards the vehicle interior.

The flap 12 is arranged to close, at least in part, the upper opening 20, in a closed position of the flap 12, as shown in FIGS. 1 and 2. In other words, the flap 12 extends over at least a part of the upper opening 20 in the closed position, such that the inner volume 16 is inaccessible from the outer face 6 of the body 2. In the closed position, the flap 12 extends in the continuity of the rest of the body 2, meaning that the outer face of the flap 12 is flush with the outer face of the body 2 and the inner face of the flap 12 is flush with the inner face 8 of the body 2 and the thickness of the flap 12 is substantially equal with the thickness of the body 2 around the guiding device 4.

The flap 12 is hinged to the transversal wall 10 so as to be movable between the closed position and an opened position (not shown), wherein the flap 12 is moved away from the upper opening 20 to free a passage for the passage of the airbag towards the vehicle. Therefore, in the opened position, the inner volume 16 is placed in communication with the outer side of the body 2 such that the inflated airbag passes through the upper opening 20 and extends in the vehicle interior. The flap 12 moves in rotation relative to the transversal wall 10 around a rotation axis extending in the transversal direction between the closed position, wherein the flap 12 extends substantially perpendicularly to the transversal wall 10, the opened position, wherein the flap 12 extends on the outer side of the body 2 away from the upper opening.

The hinge 14 is formed by a flexible net 22 attached, at one of its ends 24 to the transversal wall 10 and extending in the flap 12, as will be described in greater detail below. At the transition between the transversal wall 10 and the flap 12, the net 22 for example extends in a weakened portion 26 of the flap 12, wherein the thickness of the flap 12 is locally reduced as shown in FIG. 4. Such a weakened portion 26 and net 22 allow the rotation of the flap 12 relative to the transversal wall while the net 22 prevents the flap 12 from detaching from the guiding device during the deployment of the airbag. In other words, the net 22 maintains the flap 12 attached to the transversal wall 10 during its displacement from the closed position and the opened position such that the flap 12 does not fly into the vehicle interior under the force exerted by the inflating airbag on the flap 12.

According to an embodiment, as shown in FIG. 4, the upper opening 20 is closed by two flaps 12 in the closed position. In this case, each flap 12 is connected and hinged to one of the transversal wall 10. In this case, the net 22 extends in both flaps 12 and the opposite ends of the net 22 are each attached to the corresponding transversal walls 10 such that the net 22 forms the two hinges 14 connecting the flaps 12 to the corresponding transversal walls 10. The flaps 12 are connected to each other by a tearable portion 28, for example extending substantially at the center of the upper opening according to the longitudinal direction, as shown in FIG. 4. The tearable portion 28 is arranged to be torn by the airbag during the deployment of the airbag such that the flaps 12 are separated from each other and are allowed to move from the closed position to the opened position independently from each other. Such a tearable portion 28 is for example formed by a portion of material having a reduced thickness compared to the thickness of the rest of the flaps 12. The net 22 can also be weakened in the tearable portion 28 in order to be torn during the deployment of the airbag. The force exerted by the airbag during it deployment on the flaps 12 cause the tearing of tearable portion 28.

The flap(s) 12 can also be connected to the longitudinal walls 18 of the guiding device 4. In this case, this connection is also formed by a tearable portion (not shown) arranged to be torn by the deployment of the airbag such that the flap(s) is (are) liberated from the longitudinal walls to be able to move from the closed position to the opened position.

According to an embodiment, the guiding device 4 further comprises at least one screwing shaft 30 for attaching an airbag module to the guiding device 4. Such a screwing shaft 30 comprises a threaded opening, extending for example according to the elevation direction and arranged to receive a screw from the airbag module. The screwing shaft 30 is for example arranged in one of the longitudinal walls 18. According to the embodiment shown in the figures, several screwing shafts 30 are provided, for example four screwing shafts 30 each arranged in the vicinity of a corner of the inner volume, i.e. in the vicinity of a junction between a transversal wall 10 and a longitudinal wall 18.

The guiding device 4 further comprises an overmolded structure 32 overmolded by the material of the body 2 of the trim element 1, as shown in FIGS. 1, 2 and 4. The overmolded structure 32 is shown alone in FIG. 3. By overmolded, it is meant that the material forming the body 2 is molded on the overmolded structure 32, i.e. the overmolded structure 32 is placed in a molding cavity having the shape of the body 2 and the material forming the body is injected in this cavity over the overmolded structure 32, as will be described subsequently.

More particularly, the overmolded structure 32 comprises at least one transversal wall portion 34 and a flap portion 36.

The transversal wall portion 34 extends in the thickness of at least a part of the transversal wall 10, as shown in FIG. 4. In other words, the transversal wall portion 34 is embedded inside at least a portion of the transversal wall 10 and the material of the body 2 forming the transversal wall 10 extends around the transversal wall portion 34. Consequently, where the transversal wall portion 34 extends, the thickness of the transversal wall 10 is formed by the addition of the thickness of the transversal wall portion 34 and of the thickness of material of the body 2 extending around the transversal wall portion 34. The thickness of material of the body 2 is therefore reduced compared to the thickness of material of the body between the outer face 6 and the inner face 8. Thanks to this reduced thickness, the body 2 can be injected molded without sink marks appearing on the outer face 6 upright the transversal wall 10 extending on the inner face 8 since such sink marks appear when the thickness of the injected material is the same between the outer face 6 and the inner face 8 and in the transversal wall 10. According to an embodiment, the thickness of the transversal wall portion 34 is such that the thickness of material of the body 2 in the transversal wall is substantially half of the thickness of material between the outer face 6 and the inner face 8.

The transversal wall portion 34 extends at least in an upper portion of the transversal wall 10, i.e. the portion of the transversal wall 10 extending close and up to the inner face 8 of the body 2, as shown in FIG. 4. When the guiding device 4 comprises two transversal walls 10, the overmolded structure 32 comprises two transversal wall portions 34, each extending in the thickness of one of the transversal walls 10. When the guiding device 4 further comprises longitudinal walls 18, the overmolded structure 32 also comprises longitudinal wall portions 38 extending in the thickness of the longitudinal walls 18 in order to reduce the thickness of material of the body 2 in the longitudinal walls 18, in the same manner as for the transversal walls 10. When the guiding device 4 comprises screwing shaft(s) 30, the overmolded structure 32 comprises screwing shaft portions 40 extending in the thickness of the screwing shaft(s) 30. As more particularly visible in FIG. 3, the overmolded structure 32 can have other portions 42 extending in the thickness of any part of the body 2 protruding from the inner face 8 of the body 2 in order to reduce the thickness of material forming the body 2 in these protruding portions such that the body 2 can be produced without sink marks on the outer face 6 of the body 2 upright of these protruding parts.

Figure 3:
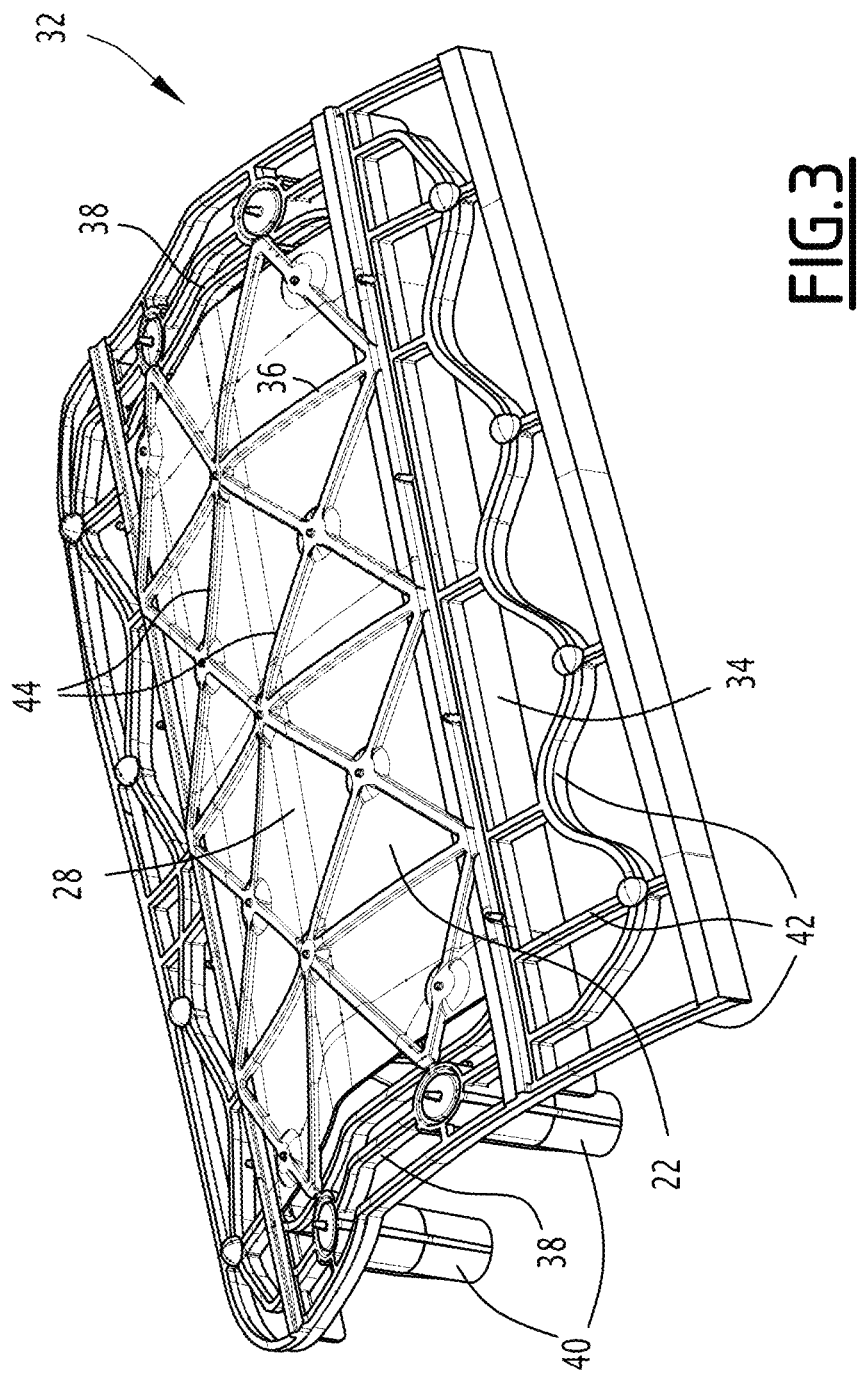
FIG. 3 is a perspective view of the overmolded structure of the trim element of FIG. 1.

The flap portion 36 of the overmolded structure 34 extends in the thickness of the flap(s) 12, meaning that the flap portion 36 is embedded in the material of the body 2 forming the flap(s) 12. As shown in FIG. 3, the flap portion 36 is for example formed of ribs 44 forming a grid, such that the quantity of material of the overmolded structure 32 forming the flap portion 36 is reduced. The shape of the grid of ribs 44 shown in FIG. 3 is given by of example only and other shapes could be contemplated. More generally, the shape of the overmolded structure 32 shown in FIG. 3 is given by way of example and other shapes could be contemplated, more particularly depending on the protruding parts of the body 2 on the inner face 8, as described previously.

The net 22 is overmolded by the overmolded structure 32, meaning that the material forming the overmolded structure 32 is molded over the net 22 such that the net 22 is attached to the overmolded structure 32 during the molding of the overmolded structure 32. More particularly, when the guiding device 4 comprises two transversal walls 10, the ends 24 of the net 22 are overmolded by the transversal wall portions 34 of the overmolded structure 32 and a central portion of the net 22 extending in the flap(s) 12 is overmolded by the flap portion 36 of the overmolded structure 32 such that the portion of the net forming the hinge(s) 14 extends between overmolded portions of the net 22. Overmolding the net 22 with the overmolded structure 32 therefore facilitates the positioning of the net 22 in the guiding device 4 and more generally in the body 2 of the trim element 1 since the net 22 is maintained in position by the overmolded structure 32 when the body 2 is molded over the overmolded structure 32.

The trim element 1 described above is suitable for being used when the outer face 6 of the body is directly visible from the vehicle interior since there are no sink marks on the outer face 6 of the body. Likewise, the trim element 1 is suitable for being used when a skin is applied directly on the outer face 6 of the body 2, for example via a thermocovering process. In this case, the skin can adopt the shape of the outer face 6 without showing sink marks from the outer face 6 of the body 2.

The method for producing the trim element 1 will now be described.

The overmolded structure 32 is first produced in a first molding cavity having the shape of the overmolded structure 32. During this step, the net 22 is first placed in the first molding cavity and the material forming the overmolded structure 32 is injected in the first molding cavity over the net 22.

The overmolded structure 32 is than placed in a second molding cavity having the shape of the body 2 and of the guiding device and the material forming the body 2 is injected in the second molding cavity over the overmolded structure 32. The material forming the overmolded structure 32 is for example the same material as the same material forming the body 2, which enhances the attachment of the overmolded structure 32 to the body 2 thanks to the compatibility of the materials forming the overmolded structure 32 and the body 2.

According to a particular embodiment, the first molding cavity and the second molding cavity are parts of a single molding tool. In this molding tool, an overmolded structure 32 for a subsequent trim element 1 can be produced in the first molding cavity while a trim element 1 is produced in the second molding cavity with a previously produced overmolded structure 32. When the trim element 1 is finished, the molding tool is opened, the trim element 1 is retrieved from the molding tool and the overmolded structure 32 produced in the first molding cavity is transferred in the second molding cavity. A net 22 is than placed in the first molding cavity and the molding tool is closed to produce a new overmolded structure 32 and a new trim element 1. The obtained trim elements 1 can be used directly as finished parts or can be transferred to a thermocovering station to apply a skin on the outer face 6 of the bodies.

The invention claimed is:

1. Trim element for a vehicle, comprising a body defining an outer face, intended to be turned towards the vehicle interior, and an inner face opposite the outer face, and at least one guiding device for the deployment of a vehicle airbag, said guiding device being integral with the body and comprising at least one transversal wall protruding from the inner face of the body, said transversal wall delimiting at least part of an inner volume for receiving an airbag during its deployment and defining at least part of an upper opening for the passage of the deployed airbag, said guiding device further comprising at least one flap connected to the transversal wall by a hinge, said flap being movable relative to said transversal wall between a closed position wherein the flap closes at least a part of the upper opening, and an opened position wherein the flap frees at least a part of the passage for the deployed airbag, wherein the guiding device comprises an overmolded structure comprising at least one transversal wall portion extending in the thickness of at least part of the transversal wall and at least one flap portion extending in the thickness of at least part of the flap, said overmolded structure being overmolded by the material of the body, the guiding device further comprising at least one net, comprising one end overmolded by at least part of the transversal wall portion of the overmolded structure and one central portion overmolded by at least part of the flap portion of the overmolded structure, a portion of the net extending between the end of the net and the central portion of the net forming the hinge of the guiding device.

2. Trim element according to claim 1, wherein the guiding device comprises two transversal walls extending on either side of the inner volume, the overmolded structure comprising two transversal wall portions, each transversal wall portion extending in the thickness of one of the two transversal walls of the guiding device.

3. Trim element according to claim 2, wherein the guiding device comprises two flaps, closing together the upper opening in the closed position and freeing together the passage for the deployed airbag in the opened position, each flap being connected to one of the transversal walls by a hinge, the flap portion of the overmolded structure extending in the thickness of the two flaps.

4. Trim element according to claim 3, wherein two opposite ends of the net are overmolded by at least part of the transversal wall portions of the overmolded structure, the portion of the net extending between the ends and the central portion forming the two hinges between the transversal walls and the flaps of the guiding device, the flaps being connected by a tearable portion, the central portion of the net and the tearable portion being arranged to break during the deployment of the airbag to allow the two flaps to move between the closed position and the opened position.

5. Trim element according to claim 2, wherein the guiding device comprises at least two longitudinal walls extending between ends of the transversal walls and delimiting, with said transversal walls, the inner volume, the overmolded structure comprising at least two longitudinal wall portions, each extending the thickness of at least part of one of the longitudinal walls.

6. Trim element according to claim 1, wherein the thickness of the transversal wall of the guiding device is substantially equal to the thickness of the body between the inner face and the outer face.

7. Trim element according to claim 1, wherein the material of the overmolded structure is the same material as the material forming the body.

8. Trim element according to claim 1, wherein the guiding device comprises at least one screwing shaft for attaching an airbag module to the guiding device, the overmolded structure comprising at least one screwing shaft portion forming said screwing shaft and being overmolded at least in part by the material of the body.

\* \* \* \* \*